US008732598B2

(12) United States Patent
Fox et al.

(10) Patent No.: US 8,732,598 B2
(45) Date of Patent: May 20, 2014

(54) SYSTEMS AND METHODS FOR FIELD DATA COLLECTION

(75) Inventors: Charles W. Fox, Washington, DC (US);
Michael P. Schu, Washington, DC (US)

(73) Assignee: The Wendell Group, Inc., Washington, DC (US)

( * ) Notice: Subject to any disclaimer, the term of this patent is extended or adjusted under 35 U.S.C. 154(b) by 1302 days.

(21) Appl. No.: 12/081,627

(22) Filed: Apr. 18, 2008

(65) Prior Publication Data
US 2008/0263465 A1 Oct. 23, 2008

Related U.S. Application Data

(60) Provisional application No. 60/907,861, filed on Apr. 19, 2007.

(51) Int. Cl.
*G06F 3/048* (2013.01)
(52) U.S. Cl.
USPC .......................................... 715/764
(58) Field of Classification Search
USPC ........................................... 715/764
See application file for complete search history.

(56) References Cited

U.S. PATENT DOCUMENTS

| 5,440,401 | A | * | 8/1995 | Parulski et al. | 386/225 |
|---|---|---|---|---|---|
| 5,699,244 | A | * | 12/1997 | Clark et al. | 702/2 |
| 5,896,133 | A | * | 4/1999 | Lynch et al. | 715/784 |
| 6,083,353 | A | * | 7/2000 | Alexander, Jr. | 202/158 |
| 7,593,751 | B2 | * | 9/2009 | Barbosa et al. | 455/556.1 |
| 2004/0107114 | A1 | * | 6/2004 | Curtis | 705/1 |
| 2004/0128613 | A1 | * | 7/2004 | Sinisi | 715/500 |
| 2005/0222889 | A1 | * | 10/2005 | Lai et al. | 705/9 |
| 2007/0095887 | A1 | * | 5/2007 | Barbosa et al. | 235/375 |
| 2007/0271195 | A1 | * | 11/2007 | Wollin et al. | 705/36 R |

* cited by examiner

*Primary Examiner* — Omar Abdul-Ali
*Assistant Examiner* — Anil Bhargava
(74) *Attorney, Agent, or Firm* — Venable LLP; Michele V. Frank

(57) ABSTRACT

Systems and methods are provided for automated field data collection. A client system may download graphical representations and space hierarchy information associated with the project from a server. A user may open, on the client system, an area where the field data collection is to occur (e.g., a room in a building), whereby the client system automatically navigates to a pre-defined region of the graphical representation (e.g., an architectural floor plan). For each discrepancy identified, the user may touch a corresponding location on the graphical representation and select a discrepancy type from a list. The user may then associate additional data files, such as image files, audio files, video files, and GPS coordinates with the discrepancy. An organization responsible for correcting the discrepancy may be automatically assigned and/or notified based on an association made on the server.

36 Claims, 8 Drawing Sheets

SYSTEMS AND METHODS FOR FIELD DATA COLLECTION

CROSS-REFERENCE TO RELATED APPLICATIONS

This application claims priority to U.S. Provisional Application No. 60/907,861, filed Apr. 19, 2007, the disclosure of which is incorporated herein by reference in its entirety.

TECHNICAL FIELD OF THE INVENTION

The present invention relates generally to systems and methods to capture and resolve discrepancies identified during field data collection. Additionally, the present invention relates to systems and methods to electronically document and manage discrepancies.

BACKGROUND OF THE INVENTION

Field data collection has been used in many industries or applications. The construction industry will be used as an exemplary application of the present invention throughout the specification, but it is noted that the present invention may be equally applicable in any field or industry responsible for remote data collection. The present invention is not in limited in any way to the construction industry. As an illustrative example, field data collection is prevalent in the construction field, where three methods may exemplify how data is collection and managed: 1) Paper and pencil, 2) computer spreadsheets, and 3) handheld technology.

The most widely used method for field data collection in the construction industry is hand writing notes on paper. An individual may describe the nature of a discrepancy and its location on sheets of paper or floor plans. As floor plans may be produced on paper that is 36"×48", their bulk and weight make toting them around inconvenient. This approach is easy to use and the results (to be shared with third parties responsible for fixing discrepancies) are understood with relative ease. However, the amount of information written down in a limited area, with arrows pointing to the exact location of a discrepancy, can become difficult to interpret, due both to illegible handwriting and the clutter of innumerable discrepancies. As pens are used to create a permanent record, corrections to notes exacerbate the clutter. The discrepancies often are re-recorded into a computer system to manage resolution. As the number of discrepancies identified can number in the tens of thousands, this duplicative work is expensive and time consuming.

The next most common method is to record discrepancies directly into a laptop computer, for example into a spreadsheet. Recording field data directly into a computer avoids transcription errors, can automate some of the collection process (e.g., using preset discrepancy types), and eliminates the additional work associated with recording discrepancies on paper and subsequently in a computer. The method requires that the location of a discrepancy is recorded textually, rather than graphically, an imprecise and easily misunderstood approach. Further, in order to type on the laptop, the user needs a platform on which to rest the computer.

Finally, handheld devices add portability, but have yet to provide a way to graphically capture the nature of a discrepancy and its location. Handheld technology commonly include cell phones, cameras, touch screens, and GPS receivers. But no handheld technology includes the functionality to include a high resolution floor plan, automate some of the process with preset discrepancy types, and photograph the discrepancy.

Generally, needs exist for improved methods of field data collection that reduce time and effort from field data collectors and facilitate standardized data collection procedures and reporting.

BRIEF SUMMARY OF THE INVENTION

An embodiment of the present invention may provide a system and method for automated field data collection. A client system may download digitized images associated with the field data collection project, such as floor plans, and pick lists associated with a particular project. A user may open, on the client system, an area where the field data collection is to occur (e.g., a room in a building), whereby the client system automatically navigates to a pre-defined region of the downloaded image (e.g., an architectural floor plan). For each discrepancy identified, the user may touch a corresponding location on the image and select the discrepancy type from a list. The user may then associate photographs taken with the client system, dictation, and GPS coordinates with the discrepancy. The organization responsible for correcting the discrepancy may be automatically assigned and/or notified based on an association made on the server.

Embodiments of the present invention solve many of the problems and/or overcome many of the drawbacks and disadvantages of the prior art by providing methods and systems for field data collection.

Embodiments of the present invention may include a method for structured field data collection including providing a space hierarchy to a user, wherein the space hierarchy comprises one or more spaces and corresponding sub-spaces, wherein the sub-spaces comprise information regarding properties of the one or more spaces and corresponding sub-spaces, receiving a selection of a space of interest and corresponding sub-spaces selected from the space hierarchy, receiving a unique identifier of an actual space related to the selection of the space of interest and corresponding sub-spaces, providing a graphical representation to the user of the actual space corresponding to the selected space of interest and corresponding sub-spaces by using the unique identifier, associating user collected data with a position on the graphical representation, wherein the position corresponds with an actual position of the actual space, and wherein the user collected data is categorized based upon the selection of the space of interest and corresponding sub-spaces, and receiving and storing the user collected data.

Embodiments may also have the space selected from the space hierarchy comprises information regarding predetermined, categorized and standardized descriptions of actual sub-spaces. The user collected data may be collected on a portable computing device. The user interactively may navigate the space hierarchy to select the space of interest and corresponding sub-spaces that describes the actual space. The graphical representation may be selected from the group consisting of architectural diagrams, digital images, photographs, schematic diagrams, maps, sketches, and combinations thereof. Embodiments may also include converting the graphical representation between high resolution and low resolution versions for storage in a database and display on a portable computing device, respectively.

Embodiments may also include user collected data representing one or more discrepancies capable of being acted on by a third party. Embodiments may further include automatically identifying one or more third parties associated with the one or more discrepancies, verifying that the one or more discrepancies have been acted on by a third party and verifying that the action is complete or not complete, and/or suggesting a classification of the one or more discrepancies based upon the space and corresponding sub-spaces.

Embodiments may include allowing a user to repeatedly access the graphical representation and add, remove or edit the user collected data. Embodiments may include pre-associating regions of the graphical representation with spaces and corresponding sub-spaces.

Embodiments may include placing a visual notation at the position on the graphical representation to associate the user collected data with the position on the graphical representation, wherein the visual notation is coordinate mapped to the position on the graphical representation, and retaining the coordinate mapping of the visual notation and the graphical representation when converting between a low-resolution version of the graphical representation and a high-resolution version of the graphical representation, wherein the visual notation remains associated with the position on the graphical representation during conversion.

Embodiments may include associating the user collected data with a separate data file, wherein the separate data file may be selected from the group consisting of image files, audio files, video files, freeform notations, GPS coordinates, and combinations thereof.

Embodiments may include generating a report of the user collected data, wherein the report comprises the position of the graphical representation corresponding to the actual position of the actual space.

Embodiments may also include a system for structured field data collection including a server in communication with a database, wherein the database stores graphical representations of spaces and user collected data, wherein the server is further in communication with a portable computing device, wherein the user collected data is entered and processed into the database via the portable computing device, the entering and processing including the steps of: providing a graphical representation to the portable computing device of a user-identified space, categorizing the user collected data based upon a user-selected sub-space within a space hierarchy, wherein the space hierarchy comprises one or more spaces and corresponding sub-spaces, wherein the sub-spaces comprise information regarding properties of the one or more spaces and corresponding sub-spaces, associating the user collected data with the graphical representation, and storing the associated user collected data and graphical representation in the database.

Embodiments may include steps where the associating comprises coordinate mapping one or more visual notations, representing the user collected data, with the graphical representation on the portable computing device, and wherein the storing further comprises retaining the coordinate mapping of the associated one or more visual notations and graphical representation when converting between a low-resolution version of the graphical representation and a high-resolution version of the graphical representation.

Embodiments may include steps where at least some of the processing occurs at the portable computing device. Embodiments may include steps where the user collected data is received via a browser on the portable computing device.

Embodiments may also include a method for structured field data collection, the method steps stored in a storage medium and executed by one or more processors including providing one or more space types to a user, wherein the one or more space types are selected from a pre-determined source of user-selectable space types, and wherein the one or more space types comprise information regarding properties of actual spaces, providing a graphical representation to a user of a user-identified space of interest, associating a user-selected space type, representing the user-identified space of interest, with a position on the graphical representation, and categorizing user collected data based upon the user-selected space type, wherein the user collected data corresponds to the position on the graphical representation.

Embodiments may include creating one or more visual indications of the user collected data on the position on the graphical representation, associating the one or more visual indications with one or more coordinates in the graphical representation, and/or converting the graphical representation from low resolution to high resolution while retaining the association of the one or more visual indications with the one or more coordinates of the graphical representation.

Embodiments may include converting the graphical representation between high resolution on the database and low resolution for display on a portable computing device.

Embodiments may also include a method for structuring information types including providing a hierarchy of spaces, wherein the hierarchy represents standardized space types, and wherein the space types comprise information regarding properties of actual spaces, receiving user collected data corresponding to an actual space and a user-selected space type associated with the actual space, categorizing the user collected data based upon the user-selected space type, and generating a report of the user collected data.

Embodiments may include generating the report comprises sorting and filtering the user collected data based upon the user-selected space type to provide statistical analysis of the actual space. Embodiments may include associating the user collected data with a graphical representation of the actual space.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE INVENTION

The present invention may provide a system and method for field data collection. The system may optimize the collection of discrepancy information by recording information faster and more accurately than conventional methods by reducing the effort to prepare for field data collection and associating multiple forms of documentation. The present invention may have a wide variety of uses for field data collection, to include markets such as construction, medicine, automobile repair, and other fields where data is collected in the field. Generally, the purpose of the invention may be to collection data about a discrepancy, and facilitate capturing the "who, what, where, when, how, and why" associated with a discrepancy. A discrepancy for the purposes of the present invention may be defined as something that fails to meet specification, something noteworthy, or something otherwise out of the ordinary. A discrepancy can also suggest, as in the construction industry, that the discrepancy will be fixed or addressed by a third party.

In one embodiment, a building structure, called a "building tree" or "space hierarchy" in the present description, may be modeled in the system in hierarchic, parent/child form (e.g., a building with towers, in which there are floors, on which there are rooms) and maps each room in the building model with a "space type" or "sub-space". A space type (e.g., apartment, reception area) may create a nomenclature, usually in hierarchic form, to describe the standard features of a particular space. For example, a sink (a parent) has a faucet (a child) which has a spout (a child). Using space types may ensure that the discrepancy description is consistent and precise. Whereas the structure of a building varies widely, the features of a space type are consistent and consequently can be re-used to model a building. In practice, in one embodiment of the present invention, the building tree may be created by a customer service representative when a new project is created by querying a customer about the field data collection work request. Queries may include: What are the building areas to inspect (e.g., north tower, east and west wing), the number of spaces to be inspected, the floors on with they exist, room numbers, etc. The customer may also furnish graphical representations (e.g., architectural drawings, maps) to support the data collection. With the information provided by the customer, the customer service representative may create the project in the system, to include the address, work instructions, and building tree, and graphical representations.

Figure 1B:
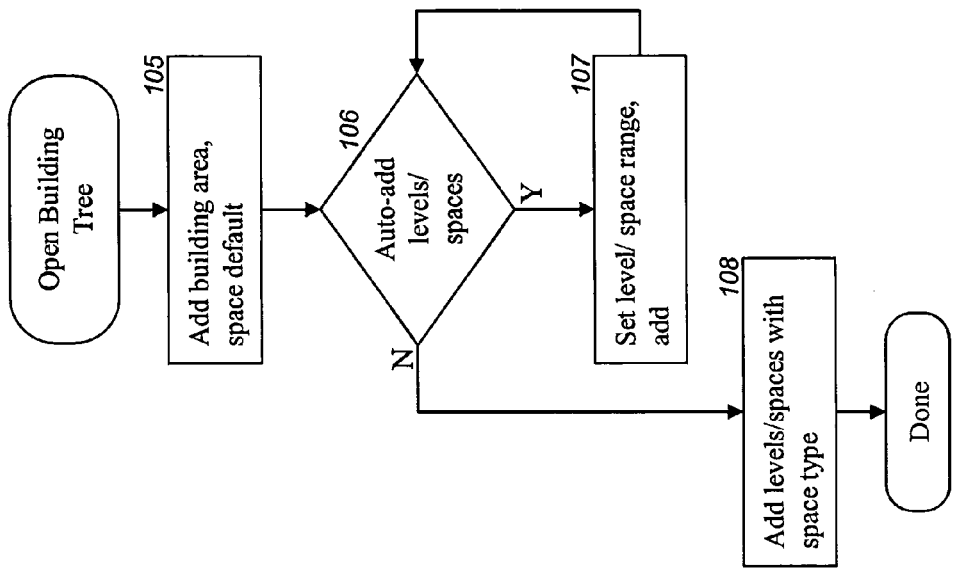
FIGS. 1A-B are flow diagrams to create a space type pick list and to create a building tree that uses the aforementioned space type pick list in one embodiment of the present invention.
Figure 1A:
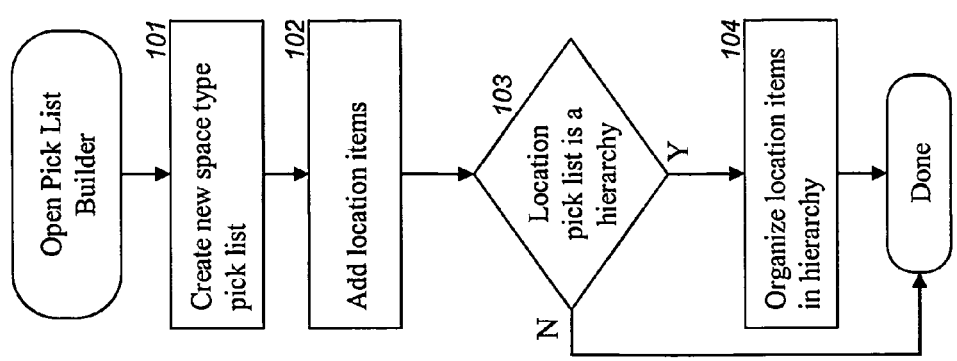

FIGS. 1A-B illustrate creation of space types in the pick list builder module and mapping the space type to a building tree in one embodiment of the present invention. In step 101 of FIG. 1A, a space type may be created with a common title (e.g., Apt) to which a unique identifier may be added in the building tree (e.g., Apt 801). In step 102, location items (e.g., closet, window, carpet, air conditioning register) may be added to the space type. In step 103, the user may decide whether to organize the space type into a hierarchy. In step 104, the location items may be organized into a hierarchy.

In FIG. 1B, a building tree may be created. In step 105, one or more building areas may be created (e.g., north tower) and a default space type may be mapped to the building area (e.g., Apt) so children of the building area (i.e., level and spaces) may automatically inherit the space type. In step 106, the user may choose to add multiple levels and spaces in a single step. In step 107, the user selects the parent to which children will be added and defines the numeric range of each level or space added (e.g., for levels, 1-8; for apartments, 800-820). The child may inherit the space type of the parent, so children of level 8 will automatically be the space type "Apt". The space type of a level or space may be changed from the inherited space type. In step 108, the user may create levels and spaces individually, and may change the inherited space type upon creation.

Figure 2:
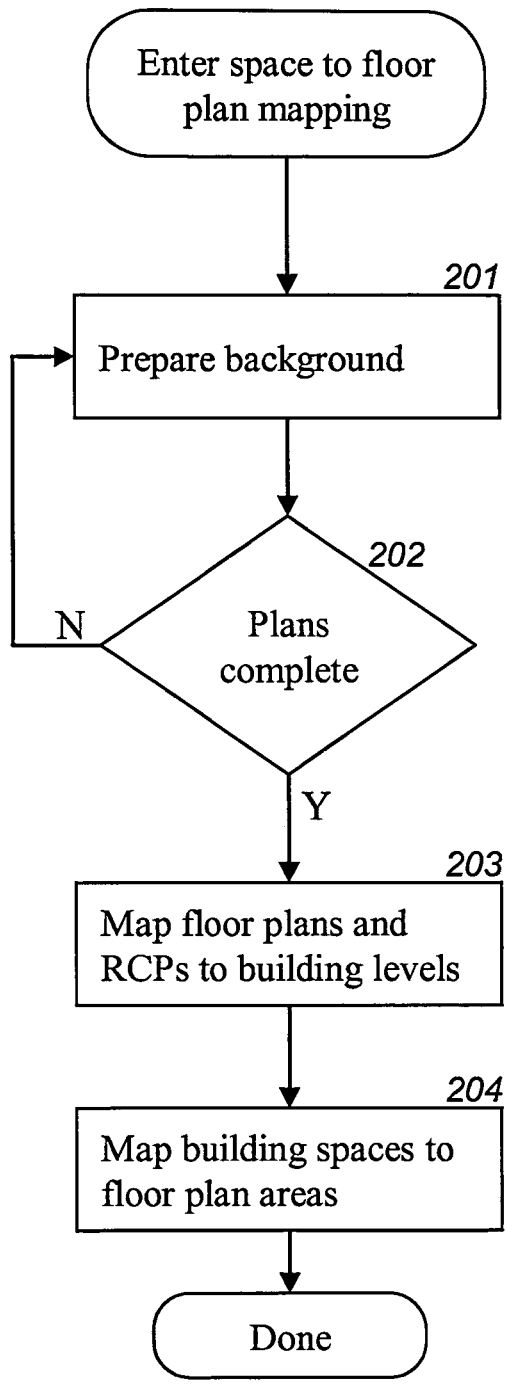
FIG. 2 is a flow diagram to prepare architectural drawings and to map building spaces (e.g., an apartment, office) to areas on an area on an architectural drawing in one embodiment of the present invention.

FIG. 2 is a flow diagram that illustrates how building spaces (e.g., apartments, offices) are mapped to the associated region on an architectural drawing (e.g., floor plan, reverse ceiling plan), hereafter background or graphical representation. On the server, by mapping the space (e.g., Apt 501) to a region same region of the background, the client may "open" to open the same region on the client when the user navigates to that building space in the building tree. Since the screen size, screen resolution, and CPU power of the client may be significantly less then the server, mapping the building space and region on the background may reduce time to find the correct region and reduces errors associated with recording discrepancies in the wrong region of the background. In step 201, a background file format may be opened on the server. The edges of the background may be cropped to remove any extraneous region not useful for the inspection. The background resolution may be reduced so the file size is suitable for the client system to quickly open and panning is fast. The background may be saved. In step 202, the user may decide whether additional backgrounds will be created. In step 203, a primary and secondary background, for example a floor plan and a reverse ceiling plan, may be associated with a particular level in the building tree and may be overlaid on the server to ensure proper registration with one another. In step 204, a region on the background can be defined for each building space. The user may select the space in the building tree to display the background associated in step 203. The mouse pointer may be placed over a corner of the building space, and clicked and dragged to the opposing corner of the building space. A rectangle may be created that shades the area representing the region of the building space. The process can be repeated for each building space. Once the steps in FIGS. 1-2 are complete and the data associated with the project (e.g., building tree, background, and reverse ceiling plan, etc.) may be downloaded to the client system, the field data collection can be completed.

Figure 3:
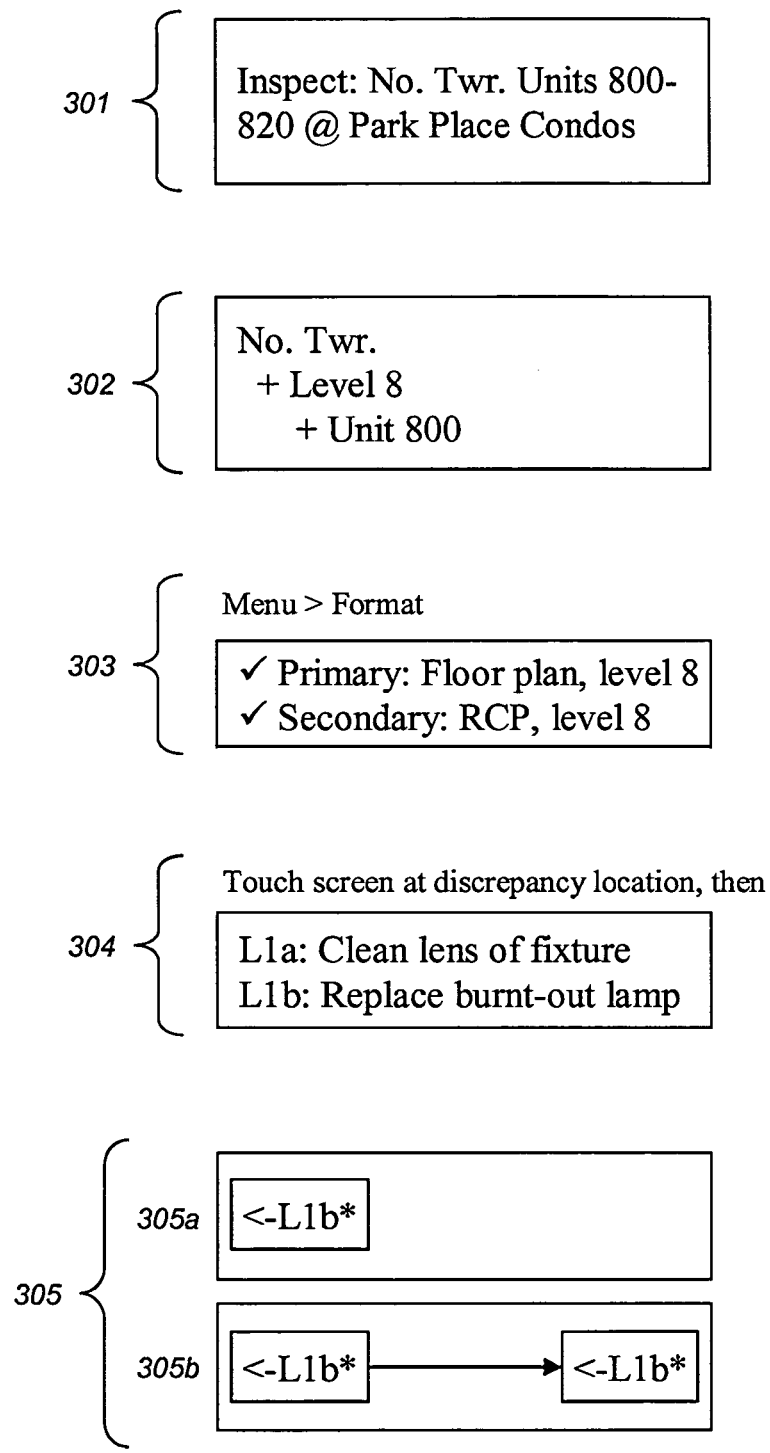
FIG. 3 illustrates creation of a discrepancy in one embodiment of the present invention.

FIG. 3 illustrates automated inspection in one embodiment of the present invention, and may be the display of client computer forms describing a discrepancy that may be created. Form 301 illustrates the type of field data collection (i.e., "Inspect") in the North Tower of Unit 800 at Park Place Condominiums. The software module in the client system to perform the inspections may be selected to open the building tree form. Form 302 illustrates the building tree, showing one of the spaces to inspect (i.e., Unit 800). The text may be derived from the building tree created on the server "No. Twr." may be the building area, "Level 8," and "Unit 800." The building tree can be modified on the client. Unit 800 may be selected to open Form 303. Form 303 illustrates whether the backgrounds are mapped to the proper building level, and can be changed. The user may click a button to begin inspection at which point the client system may display the region of the background associated with the building space mapped in FIG. 2, step 204. The user can pan over the background to display different regions of the background, and can zoom in and out. To create a discrepancy, the user may touch the client system screen where a discrepancy exists and the client system form with a list of discrepancy types (e.g., "L1a: Clean lens of fixture," "L1b: Replace burnt-out lamp") may be displayed. The user may select a discrepancy type and may click "OK". After a single discrepancy type has been selected for a space, a context menu may appear with a list of the most commonly selected discrepancies. The user can choose a discrepancy from the context menu or navigate to the form with the complete discrepancy type list. For a given discrepancy, the user can add a comment to augment the description and indicate whether the discrepancy is a general problem throughout the space and not limited to the point on the background where the discrepancy is created. Once the discrepancy is created, it can be automatically associated with a third party responsible for correcting the discrepancy (provided the discrepancy type is mapped to an entity on the server). The user can sketch on the background where the sketch is associated with the selected discrepancy. Form 305 illustrates the client system in two different states (Forms 305a-305b) after the discrepancy type is saved. Form 305a illustrates the discrepancy adjacent to the arrow that pinpoints the original position of the discrepancy. The asterisk may indicate a comment is associated with the discrepancy. A discrepancy can be repositioned, as illustrated in the Form in state 305b, by touching and dragging the discrepancy to another position.

Figure 4:
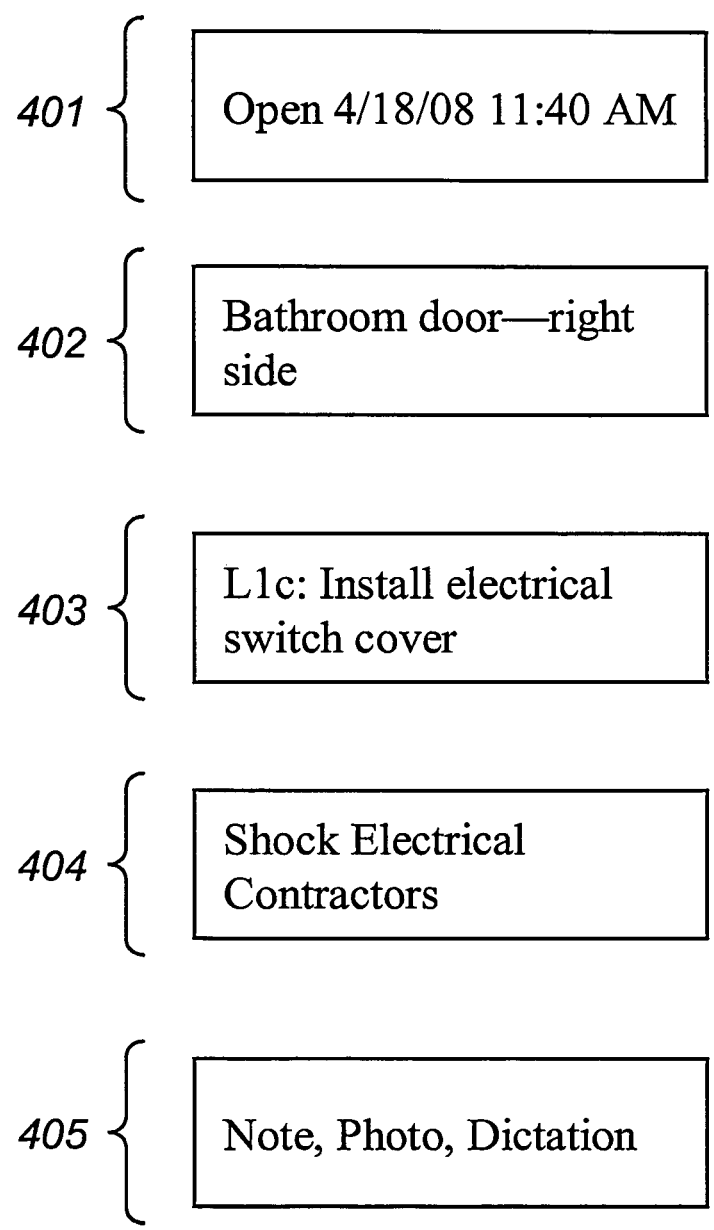
FIG. 4 illustrates editing a discrepancy and adding discrepancy documentation in an embodiment of the present invention

FIG. 4 illustrates the sections of information on a discrepancy form. Section 401 shows the most recent status of a discrepancy. Each new status for a discrepancy may be displayed on the client system screen, where the he collection of forms a history of the discrepancy (e.g., opened, corrected, closed). The status may be changed by touching the section to display the status history form. Section 402 illustrates a location of the discrepancy selected from the space type. A comment (i.e., "right side) may be appended as a comment to the location. Both the location and comment can be changed by touching the section to display location pick list for the space type. Section 403 illustrates the discrepancy type. The discrepancy type can be changed by touching the section to display the discrepancy type. Section 404 illustrates the third party responsible for correcting the discrepancy. The third party can be changed and additional third parties associated with the discrepancy added. Third parties may be notified of a discrepancy automatically via email, text message, etc. when a discrepancy is assigned to the third party. Section 405 illustrates documentation associated with the discrepancy. A freeform note, photographs, and dictation may be associated with the discrepancy. Photographs taken on the client system may be automatically associated with the discrepancy. Sketches can be made on the photographs and saved with the discrepancy.

Figure 5:
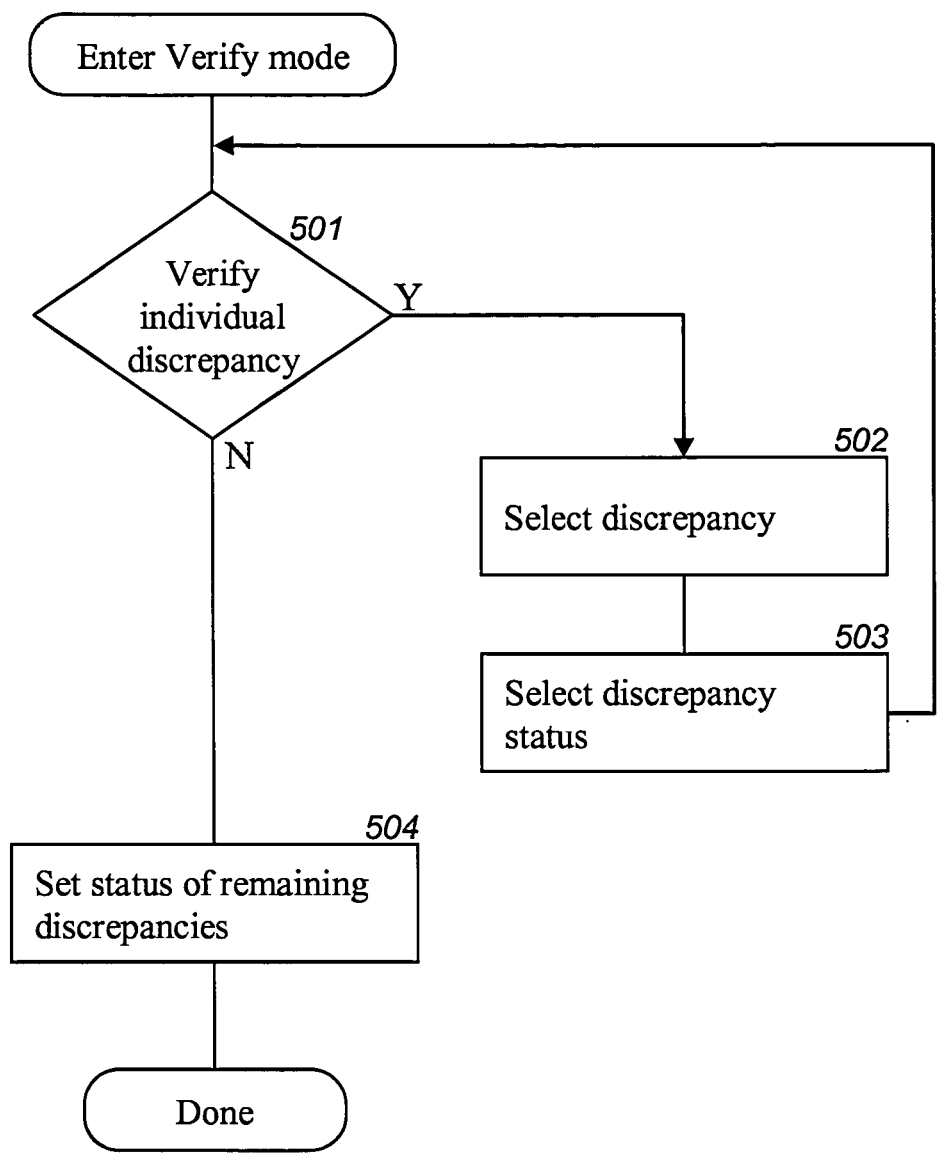
FIG. 5 is a flow diagram of how correction of a discrepancy is verified illustrating an embodiment of the present invention

FIG. 5 is a flow diagram that illustrates use of the present invention to verify that a reportedly corrected discrepancy is, in fact, corrected. The user may observe each discrepancy in a building space to confirm whether the third party corrected it. Once in the "Verify" mode, the user may decide in step 501 whether to individually verify discrepancies. In step 502, the user may touch the discrepancy on the background of the client system screen where the discrepancy is located to display a menu. In step 503, a menu item may be selected to indicate whether the discrepancy has been corrected, not corrected, or other. If the discrepancy is corrected or not corrected, the client system may update the discrepancy status and may refresh the discrepancy displayed on the screen to reflect the new status. If other is selected, a form may be opened where the status can be updated and comments or documentation can be added. The status change may remove the discrepancy from the list of those to verify. Once the individual discrepancies have been verified, step 501, the status of the remaining discrepancies can be updated in one step to indicate they are corrected or not corrected.

Figure 6:
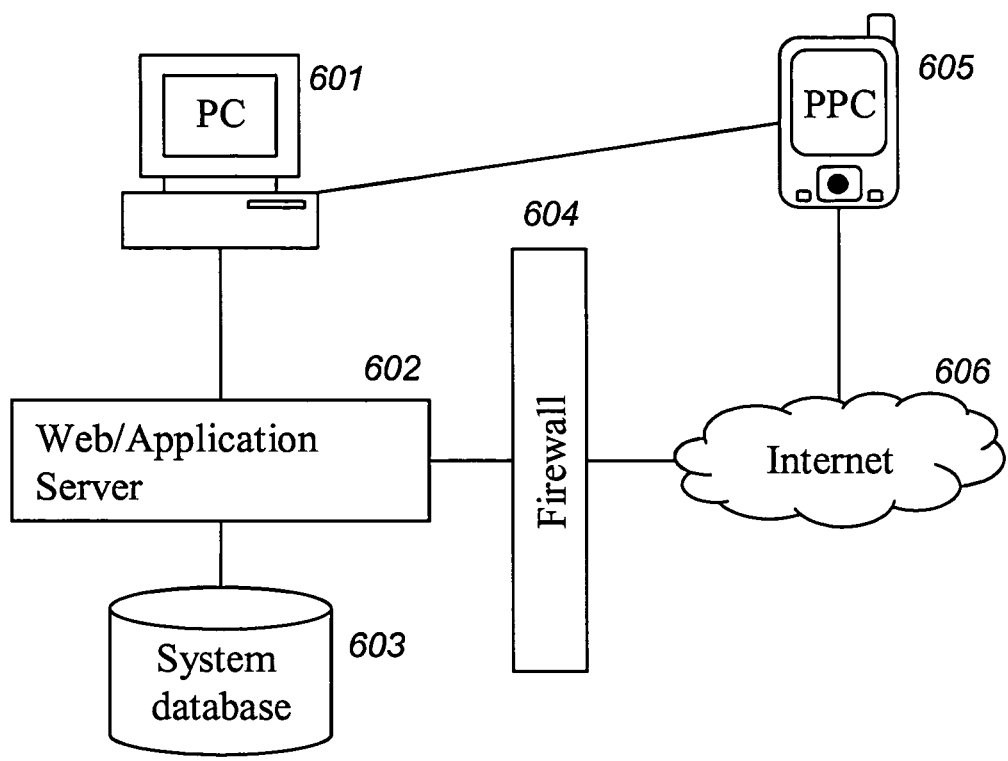
FIG. 6 is a system diagram that illustrates the components in the present invention.

FIG. 6 is a system diagram that illustrates the components in the present invention. Component 601 may represent a consumer or business personal computer ("PC") using an operating system, such as those supplied by Microsoft or Apple, connected to a communications network. Users may access the client system of the present invention with the PC via a client/server or Web-based application. The PC may be used to create and manage projects and review the results of inspection discrepancies. Component 602 may be a web/application server that accepts data requests from the PC or from outside the firewall, component 604, and either retrieves from or stores data to the system database, component 603. The firewall, component 604, may prevent unwanted access to components. The firewall may be connected to the Internet, component 606. The system client, component 605, may retrieve data and stores data via either the Internet (over a wireless connection), while connected physically to the PC, component 601, other wireless connection inside the firewall. Project data created by users may be synchronized between the PC and the client via the Web/application server, which in turn accesses the database.

Figure 7:
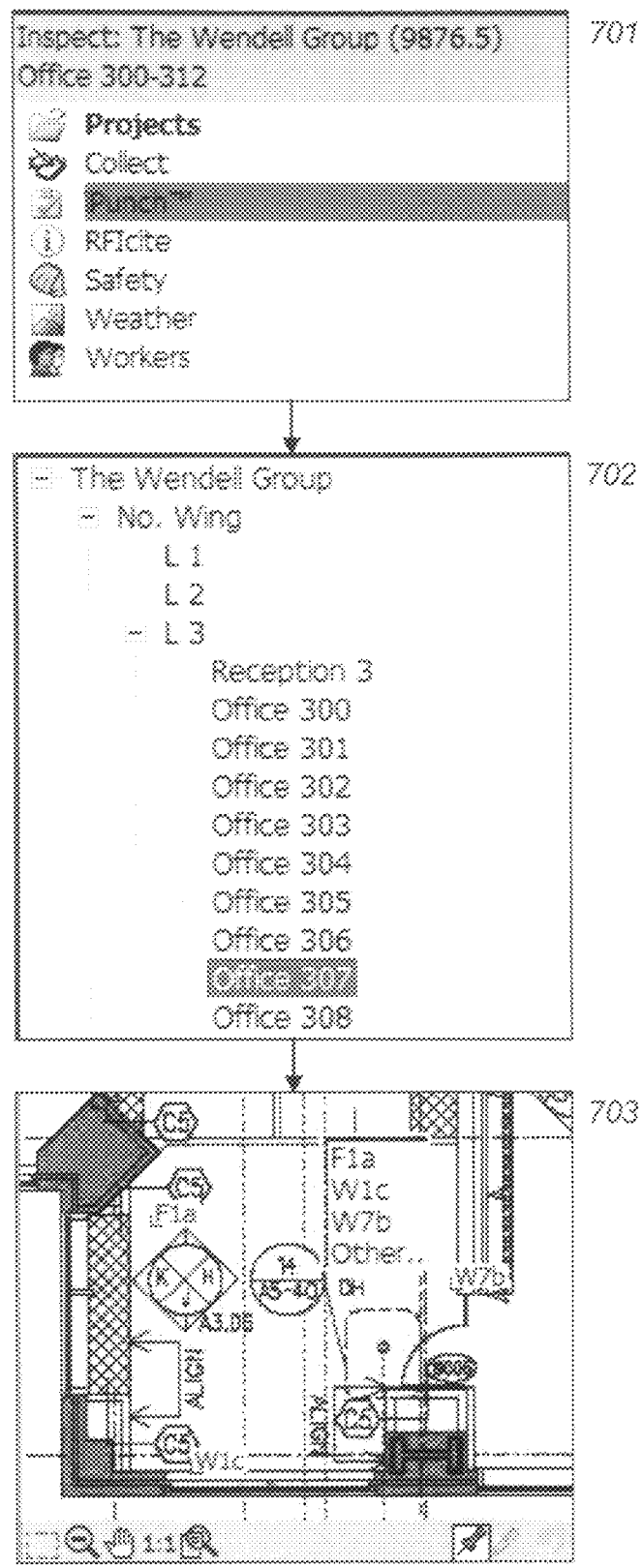
FIG. 7 illustrates an example of client system forms that display how an inspection is created in one embodiment of the present invention.

FIG. 7 illustrates an example of client system forms that display how an inspection is created in one embodiment of the present invention. The user may open and log into the client application. At the top of form 701 may be displayed the type of field data collection (i.e., Inspect), the project name (i.e., The Wendell Group), the case number (i.e., 9876.5), and instructions for the inspection (i.e., Offices 300-312). To perform the inspection, a software module, the "iPunch" module in FIG. 7, may be clicked to open form 702. In form 702, the building tree created on the PC may be displayed. Additional building areas, levels, and with spaces (with the space type) can be created. The user may select Office 307 to open the space. The space form, not shown, may display existing discrepancies. From the space form, the user may select "punch" from the menu system to open a Punch form. Form 703 illustrates where the system open the form to display the background a floor plan of Office 307. In the illustration of form 703 are three existing discrepancies with the codes F1a, W1c, W7b; the pointer in the lower left-hand corner of the code indicates the exact location of the discrepancy. Additionally, a new discrepancy is in process. At this point the user may have touched the background where the discrepancy exists and a menu may be displayed of the most popular discrepancies. The last menu in the list, "other", may cause another form with the complete list of discrepancy types to open. The discrepancies can be repositioned on the background by selecting and dragging the discrepancy. The discrepancy can also be edited, allowing the user to change the discrepancy type, adding a location (e.g., ceiling light fixture switch, white board), and adding documentation, such as a photograph of the discrepancy on which a sketch is made, dictation, free form notes, and GPS coordinates.

Figures 8A, 8B, 8C:
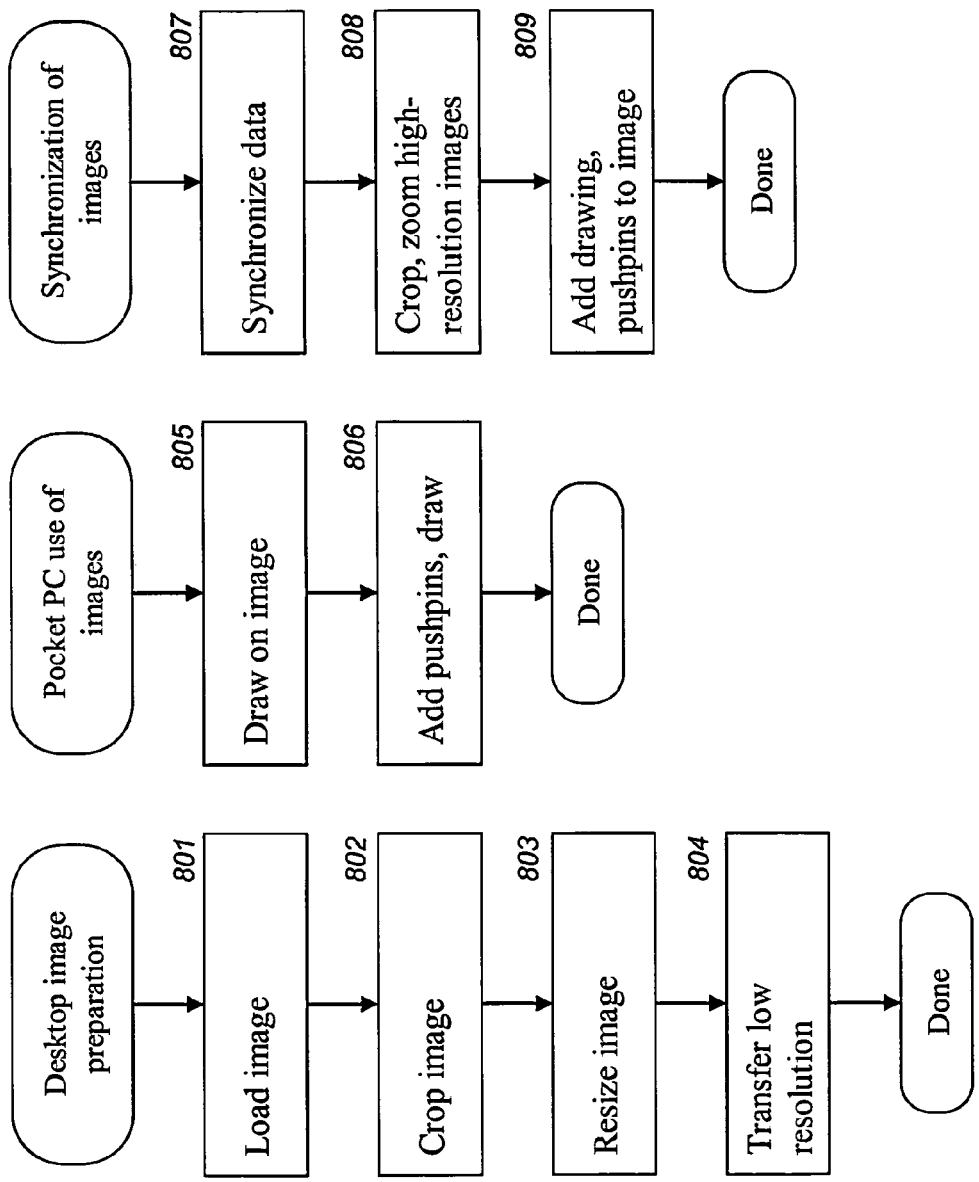
FIGS. 8A-8C are system flow diagrams to create, manipulate, and synchronize images.

FIGS. 8A-8C are system flow diagrams to create, manipulate, and synchronize images. In step 801 of FIG. 8A, to load image, the user may browse to the file on the hard drive. The system may load the file data from user supplied file path into a data stream. In step 802, to crop the image to remove any unnecessary border regions of the image, the system may display the image on the screen using the data stream from the previous step. The system may transpose coordinates (i.e., the upper left x and y coordinates, and the width and height of the image) of the user-supplied cropped rectangle from the screen's coordinate plane to the graphic file image's coordinate plane, and crops the image. The system then may write the new image data to the data stream and saves the image to the database. In step 803, which creates a lower resolution version of the image that will be passed to the client; the system may display the image on the screen using the data stream. Next, using an imaging software development kit, the system may resize the image's resolution based on user input. The system may calculate the ratio between the original resolution size and the compressed size, and saves to the database the resized data stream of the image in a separate column. Finally, the system may save the resolution ratio of the two images to the database. In step 804, to transfer the low-resolution version of the image to the client, the system may use database replication. The table containing the images may be replicated, but only the low resolution image column may be sent to the client.

In FIG. 8B, to view and draw on images on the client, in step 805, the system may load the low resolution image from the client database and the system displays on the screen. The user can zoom to a region of the image based on either user input from the panning and zooming tools, or data provided by the space mapping (auto-position) feature. To draw on the image, with the system pen selected, the system may capture screen X and Y coordinates as the user draws. The system may transpose the coordinates to the coordinate plane of the image using the current zoom magnification and view positioning on the image. Then the system may build data representing lines between each of the X and Y points captured. This data may be drawn by the system as a series of continuous lines on the screen using the line data so the user sees the drawing being drawn. Upon completing the line, the system may save the line data, zoom magnification, and position to the client database. In step 806, to add pushpins, the client system may execute a similar sequence of events as step 805. To record the position of the pushpin, the client may capture the screen X and Y coordinates as the user touches the screen with the pushpin tool, then may draw a pushpin icon on the screen. Finally the client may save the coordinates of the pushpin to the database.

In FIG. 8C, the client and server may synchronize data back to the server, to include photographs. In step 807, the client system may use database replication to send drawing and pushpin data from client to the server. In step 808, to create a high-resolution image, the server may launch a web service that uses drawing data to create views of the drawing on the original high-resolution image. The server may query the database to determine which drawings must be generated or regenerated, and loads the high resolution image from the server database. Next the server may load drawing line data, zoom magnification and position from the database. Then the server may transpose the zoom level and position using the high-to-low resolution ratio. With this information, the server may crop the image to create a new image. To add lines, the server may transpose the line coordinates from the low-resolution coordinate plane to the zoomed, cropped high-resolution coordinate plane, and draws on the new image using the transposed line data. Finally the new image may be saved to the database as the completed drawing. In step 809, the server may add push pins to the high resolution image. First, it may query the database to determine which punch list plans must be generated or regenerated. Next, it may load the high-resolution image and pushpin data from the server database. Using the position of all of the pushpins, the server may calculate an ideal zoom magnification and position on the original high-resolution image that encompasses the pushpins, to include a border around them. Then the server may zoom and crop the image to create a new image. The server may transpose the pushpin coordinates from the low-resolution coordinate plane to the zoomed, cropped, high-resolution coordinate plane, and may draw on the new image using the transposed pushpin data. Finally, the server may save the new image to the database as the completed punch list plan.

The conversion of the high-resolution image, which has a large file size, to the low-resolution image may be necessary for the client system to open. The primary challenge to achieve this may be the transposition of coordinates from one coordinate plane to another, allowing the plotting of images with resolutions at different zoom levels and positions. The coordinate planes that exist throughout this process include: the coordinate plane of the screen on the desktop; the full, high-resolution image; the cropped high-resolution image; the low-resolution image; a zoomed view of the low-resolution image; the coordinate plane of the screen on the client system; and a zoomed view of the high-resolution image. When cropping the image on the desktop, the coordinates of the crop rectangle preferably must be transposed to the coordinates of image so the crop can be executed. On the client system, the user can zoom in to a certain area of the low-resolution image before drawing. In that case, when the user draws, a double transposition may occur. The points must be transposed from the client screen to the zoomed view of the low-resolution image, and then to the plane of the full, un-zoomed, low-resolution image, and finally stored in the database. When drawings are rendered on the client system, the data may be loaded from the database and must be transposed from the low-resolution image's coordinate plane to the coordinate plane of the current zoom level and position, and then to coordinate plane of the client screen. On the server, the system may create image views. An image view may be a zoomed, cropped version of the image with drawings and/or pushpins drawn on the image. Image views may be created using the original, high-resolution image and can be considered the final product of the process. When creating the image view for reports, the zoom area of the high-resolution image used to create the image view may not be provided by data in the system. It must be calculated by using the position of every pushpin in the drawing and adding a border area around a rectangle that encompasses all of the pushpins. The size of the border cannot be fixed, but calculated relative to the zoom level being used in the image view and the size of the original image.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. A method for structured field data collection comprising:
   providing a space hierarchy to a user, wherein the space hierarchy comprises one or more spaces and corresponding sub-spaces, wherein the sub-spaces comprise information regarding properties of the one or more spaces and corresponding sub-spaces,
   receiving a selection of a space of interest and corresponding sub-spaces selected from the space hierarchy,
   receiving a unique identifier of an actual space related to the selection of the space of interest and corresponding sub-spaces,
   providing an architectural diagram to the user of the actual space corresponding to the selected space of interest and corresponding sub-spaces by using the unique identifier, receiving input from the user to select a space type description, automatically navigating the architectural diagram to the selection of the space of interest and corresponding sub-spaces, receiving input from the user regarding one or more discrepancies in the space of interest and corresponding sub-spaces, automatically identifying one or more third parties associated with acting on the one or more discrepancies, associating user collected data regarding the one or more discrepancies with a position on the architectural diagram by creating a notation on the architectural diagram at the position, wherein the position corresponds with an actual position of the one or more discrepancies, and wherein the user collected data is categorized based upon the selection of the space of interest and corresponding sub-spaces, and receiving and storing the user collected data.

2. The method of claim 1, wherein the space selected from the space hierarchy is associated with a space type that comprises information regarding predetermined, categorized and standardized descriptions of actual sub-spaces.

3. The method of claim 1, wherein the user collected data is collected on a portable computing device.

4. The method of claim 1, wherein providing the space hierarchy to the user further comprises causing the one or more spaces and corresponding sub-spaces of the space hierarchy to be displayed to the user, and wherein the user interactively navigates the space hierarchy to select the displayed space of interest and corresponding displayed sub-spaces that describe the actual space.

5. The method of claim 1, wherein the architectural diagram further comprises one or more of digital images, photographs, schematic diagrams, maps, sketches, and combinations thereof.

6. The method of claim 1, further comprising converting the architectural diagram between high resolution and low resolution versions for storage in a database and display on a portable computing device, respectively.

7. The method of claim 1, further comprising:

providing to the user one or more discrepancies that have been reported as acted on by a third party, presenting to the user a menu for indicating whether the one or more discrepancies have been corrected or have not been corrected by the action as reported, and receiving verification from the user that the action is complete or not complete.

8. The method of claim 1, further comprising suggesting a classification of the one or more discrepancies based upon the space and corresponding sub-spaces.

9. The method of claim 1, further comprising allowing a user to repeatedly access the architectural diagram and add, remove or edit the user collected data.

10. The method of claim 1, further comprising pre-associating regions of the architectural diagram with spaces and corresponding sub-spaces.

11. The method of claim 1, wherein a visual notation is placed at the position on the architectural diagram to associate the user collected data with the position on the architectural diagram.

12. The method of claim 11, wherein the visual notation is coordinate mapped to the position on the architectural diagram.

13. The method of claim 11, further comprising retaining the coordinate mapping of the visual notation and the architectural diagram when converting between a low-resolution version of the architectural diagram and a high-resolution version of the architectural diagram.

14. The method of claim 13, wherein the visual notation remains associated with the position on the architectural diagram during conversion.

15. The method of claim 1, further comprising associating the user collected data with a separate data file.

16. The method of claim 15, wherein the separate data file may be selected from the group consisting of image files, audio files, video files, freeform notations, GPS coordinates, and combinations thereof.

17. The method of claim 1, further comprising generating a report of the user collected data.

18. The method of claim 17, wherein the report comprises the position of the architectural diagram corresponding to the actual position of the actual space.

19. The method of claim 1, further comprising individually verifying the one or more discrepancies by receiving a selection of at least one of the one or more discrepancies on the architectural diagram, displaying a menu, receiving a selection of a menu item that indicates whether the discrepancy has been corrected, not corrected or other from the menu, updating a discrepancy status, and refreshing the discrepancy status displayed to the user.

20. The method of claim 19, further comprising removing the one or more discrepancies from a list of discrepancies to verify.

21. The method of claim 19, wherein the remaining one or more discrepancies are then updated in one step.

22. The method of claim 1, wherein the associating user collected data regarding the one or more discrepancies with a position on the architectural diagram is performed by a user touching the position on the architectural diagram to create the entry on the architectural diagram at the position associated with the actual position.

23. The method of claim 1, wherein providing a visual notation at the position on the architectural diagram to bring up one or more discrepancies of the actual position corresponding to the position on the architectural diagram.

24. A system for structured field data collection comprising:

a server in communication with a database, wherein the database stores architectural diagrams of spaces and user collected data, wherein the server is further in communication with a portable computing device, wherein the user collected data is entered and processed into the database via the portable computing device, the entering and processing comprising the steps of:

providing an architectural diagram to the portable computing device of a user-identified space, wherein the architectural diagram is automatically navigable to a user selection of a space of interest and corresponding sub-spaces, categorizing the user collected data based upon a user-selected sub-space within a space hierarchy, wherein the space hierarchy comprises one or more spaces and corresponding sub-spaces, wherein the sub-spaces comprise information regarding properties of the one or more spaces and corresponding sub-spaces, associating the user collected data regarding one or more discrepancies with the architectural diagram, providing a notation on the architectural diagram to bring up the user collected data regarding the one or more discrepancies with the architectural diagram, automatically identifying one or more third parties associated with acting on the one or more discrepancies, and storing the associated user collected data and architectural diagram in the database.

25. The system of claim 24, wherein the associating comprises coordinate mapping one or more visual notations, representing the user collected data, with the architectural diagram on the portable computing device.

26. The system of claim 25, wherein the storing further comprises retaining the coordinate mapping of the associated one or more visual notations and architectural diagram when converting between a low-resolution version of the architectural diagram and a high-resolution version of the architectural diagram.

27. The system of claim 24, wherein at least some of the processing occurs at the portable computing device.

28. The system of claim 24, wherein the user collected data is received via a browser on the portable computing device.

29. A method for structured field data collection, the method steps stored in a storage medium and executed by one or more processors comprising:

providing one or more space types to a user, wherein the one or more space types are selected from a pre-determined source of user-selectable space types, and wherein the one or more space types comprise information regarding properties of actual spaces, providing an architectural diagram to a user of a user-identified space of interest, associating a user-selected space, representing the user-identified space of interest, with an area on the architectural diagram, automatically navigating the architectural diagram to the selection of the space of interest and corresponding sub-spaces, receiving input from the user regarding one or more discrepancies in the space of interest and corresponding sub-spaces, providing a notation on the architectural diagram to bring up the user collected data regarding the one or more discrepancies with the architectural diagram, automatically identifying one or more third parties associated with acting on the one or more discrepancies, and categorizing user collected data based upon the user-selected space type, wherein the user collected data corresponds to the position on the architectural diagram.

30. The method of claim 29, further comprising creating one or more visual indications of the user collected data on the position on the architectural diagram.

31. The method of claim 30, further comprising associating the one or more visual indications with one or more coordinates in the architectural diagram.

32. The method of claim 31, further comprising converting the architectural diagram from low resolution to high resolution while retaining the association of the one or more visual indications with the one or more coordinates of the architectural diagram.

33. The method of claim 29, further comprising converting the architectural diagram between high resolution on the database and low resolution for display on a portable computing device.

34. A method for structuring information types comprising:

providing a hierarchy of spaces, wherein the hierarchy represents standardized space types, and wherein the space types comprise information regarding properties of actual spaces, providing an architectural diagram of an actual space, automatically navigating the architectural diagram to the selection of the actual space, receiving user collected data corresponding to the actual space and a user-selected space type associated with the actual space, wherein the user collected data is regarding one or more discrepancies in the actual space and is associated with the architectural diagram at a position in the architectural diagram corresponding to a location of the one or more discrepancies in the actual space, automatically identifying one or more third parties associated with acting on the one or more discrepancies, and providing a notation on the architectural diagram at the position, and categorizing the user collected data based upon the user-selected space type.

35. The method of claim 34, further comprising generating a report of the user-collected data, and wherein generating the report comprises sorting and filtering the user collected data based upon the user-selected space type to provide statistical analysis of the actual space.

36. The method of claim 34, further comprising associating the user collected data with the architectural diagram of the actual space.

* * * * *